United States Patent [19]

Bartels et al.

[11] Patent Number: 5,159,181
[45] Date of Patent: Oct. 27, 1992

[54] CAPACITIVE CODE READER WITH INTERELECTRODE SHIELDING

[75] Inventors: Holger Bartels, Elmshorn; Rainer Diekmann, Wedel, both of Fed. Rep. of Germany

[73] Assignees: KG Catts Gesellschaft für Erkunnungs & Sicherheits Tecnologie mbH & Co., Elmshorn, Fed. Rep. of Germany

[21] Appl. No.: 592,493

[22] Filed: Oct. 4, 1990

[30] Foreign Application Priority Data

Oct. 7, 1989 [DE] Fed. Rep. of Germany ....... 3933542

[51] Int. Cl.⁵ .......................... G06K 7/06; G06K 7/08
[52] U.S. Cl. .................... 235/441; 235/492; 235/494; 235/451
[58] Field of Search ............... 235/441, 451, 487, 488, 235/492, 494; 369/126, 151, 276; 365/102

[56] References Cited

U.S. PATENT DOCUMENTS

| | | | |
|---|---|---|---|
| 3,218,635 | 11/1965 | Masur | 365/102 |
| 3,519,802 | 7/1970 | Cinque et al. | 235/451 |
| 3,699,311 | 10/1972 | Dunbar | 235/451 |
| 3,719,804 | 3/1973 | Illing | 235/492 |
| 4,255,652 | 3/1981 | Weber | 235/492 |
| 4,355,300 | 10/1982 | Weber | 235/451 |
| 4,587,410 | 5/1986 | Milnes | 235/451 |
| 4,888,475 | 12/1989 | Müllenmeister | 235/487 |

FOREIGN PATENT DOCUMENTS 2252046 5/1974 Fed. Rep. of Germany .

Primary Examiner—Robert Weinhardt
Attorney, Agent, or Firm—Walter C. Farley

[57] ABSTRACT

A reader of a code represented by a coded array mounted on a surface and consisting of a material differing in its electrical conductivity from its surroundings comprises a pair of electrodes supported in a body movable across the surface. The pair of electrodes can be capacitively coupled, without contact, with spaced coupling sites forming part of the array. The electrodes carried by the reader body form the free ends of an open electrical circuit which has a voltage source and a detector in series. The voltage source is a signal generator applying a steady-state AC to the electrodes. The reader is movable relative and parallel to the coded surface with at least one of its electrodes above the coupling sites, the AC frequency being so selected in relation to the rate of motion that for each capacitive coupling, the measurement takes place in steady-state.

5 Claims, 6 Drawing Sheets

CAPACITIVE CODE READER WITH INTERELECTRODE SHIELDING

The invention relates to a reader for reading a code represented by a coded array of materials on a surface, the materials having electrical conductivity characteristics different from the surroundings and the reader being capacitively coupled thereto.

BACKGROUND OF THE INVENTION

Machine-read codes are known in many variations in the state of the art, illustratively employing magnetic coded array, infrared-read coded array or the like. The main advantage of such codings or code-arrays is their security relative to forgery or deception. Moreover they are desired to be easily manufactured. Illustratively such coded arrays are used on identity cards, for instance automatic-teller cards, also on goods of all sorts which must be identified by means of apposed coded arrays, for instance by the code-reader of a department store cash register.

Apparatus of the initially cited kind that operate in an electrically capacitive manner are characterized by the ease with which an electrically conductive coded array may be provided. It may be bonded in the form of a metal foil or it may be printed on the substrate. The action being capacitive, the coded array can be coated with a covering film and be made invisible to the eye. The electrical method offers the advantage over the magnetic or optical ones that the reader apparatus is simpler, being required only to comprise electrical components. Complex magnetic or optical sensors are or may be eliminated.

Such apparatus is known from the German Offenlegungsschrift 22 52 046. However, this design incurs substantial drawbacks. It specifies the capacitances of the coupling sites. For that purpose the electrodes first must be moved above the coupling sites with accurate registry, namely precisely into the specified position. Next, the coded array must be stationary relative to the reader. Then the reader's voltage source must generate a single voltage jump. Thereupon the detector of the reader determines the charging current into the capacitors formed by the coupling sites and electrodes.

This design is quite susceptible to problems resulting, for instance from erroneous mechanical adjustments. The detector in the reader must be highly sensitive because it is required to display a single, quite weak charging current. Such a detector consequently is highly susceptible to external factors. The known apparatus requires one pair of electrodes for each pair of coupling sites. If the code should be lengthy, the reader must be very complex.

SUMMARY OF THE INVENTION

An object of the present invention is to provide a capacitively coupled reader for reading a code represented by a coded array on a surface that will operate in a simple and effective manner.

Briefly described, the invention comprises a code reader for reading a code represented by a code array on a surface, the code array including pieces of a material differing in electrical conductivity from their surroundings and comprising spaced pairs of coupling sites which are selectively electrically connected or not to each other to define a code. The reader comprises the combination of a support body movable relative to the code array at a speed less than a predetermined maximum speed and first and second electrodes carried by the support body. The electrodes are arranged in the body to be capacitively coupled in contactless manner sequentially to the spaced pairs of coupling sites. An open series electrical circuit is connected between the first and second electrodes and includes a signal generator for applying substantially steady-state and uninterrupted alternating current (AC) to the electrodes and a detector for detecting flow of current through the series circuit, the AC frequency of the generator being selected in relation to the maximum speed of support body motion such that a plurality of complete cycles of AC take place while the first and second electrodes are capacitively coupled to a pair of connected coupling sites and while the coupling sites and the connection thereof complete the open circuit and allow current detection by said detector, whereby each detection is made in substantially steady state conditions.

The reader of the invention does not at all respond to the magnitude of the capacitances formed by the electrodes at the coupling sites. The capacitances formed between the electrodes and the coupling sites merely serve to couple an AC signal. The signal magnitude is immaterial to read-out. Therefore, precise mechanical adjustment is not required. Even somewhat coarse misalignment between electrodes and coupling sites can be tolerated. Moreover, the invention replaces the determination of a single capacitor charging process with a simple AC measurement. The speed of displacement of the reader relative to the coded array so matches the frequency of the AC from the voltage source that for every coupling between the coupling sites and the electrodes there is a large number of AC periods during which measurements can be carried out in AC steady state unaffected by ON or OFF transients. As a result, simple AC test equipment may be used as detectors. Further, there is the possibility, using Ohm's law, to determine the resistance of the connections between the coupling sites in which additional coded array may be provided. The relative motion between the reader and the coded array during readout may be minute, as little as zero, while on the other hand at the high frequency customarily used with the invention it may be so large that even substantially long coded arrays can be read in minimal time. Therefore, the design of the reader of the invention is especially simple because (illustratively) one pair of electrodes will suffice, being movable in sequence over all coupling sites.

The detector is advantageously designed in the manner of an AC ohmmeter and allows determining the electrical resistance between a pair of coupling sites where the coded array may be located. This provides additional coded array capability besides the standard coded array of the connections being present or not.

Where the coupling sites to be made contact with are far apart, simple electrodes are adequate to reliably distinguish between adjacent coupling sites. If, on the other hand the coupling sites are significantly closer to each other, for instance as required in smaller coded arrays with high contents of information, then it is advantageous to provide grounded shielding electrodes at the sides of the capacitively coupled electrodes to electrically shorten the laterally adjacent coupling sites so that the electrodes can couple capacitively only with coupling sites precisely underneath. As a result, the spatial resolution during reading is significantly increased.

It is also advantageous to form the electrodes with a long, narrow shape in the direction between coupling sites. Such electrodes are especially suitable for linear coded arrays at the coupling sites for instance in the form of bar codes.

By providing spacers to guide the electrodes at a constant distance from the surface, the electrode distance to the coded array is kept constant. Thereby the spatial resolution of the electrodes will remain nearly constant at the coupling.

A motor drive advantageously provides uniform advance and fully automatic readout.

BRIEF DESCRIPTION OF THE DRAWINGS

The invention is illustrated in schematic manner in the drawings wherein.

DESCRIPTION OF THE PREFERRED EMBODIMENT

Figure 1:
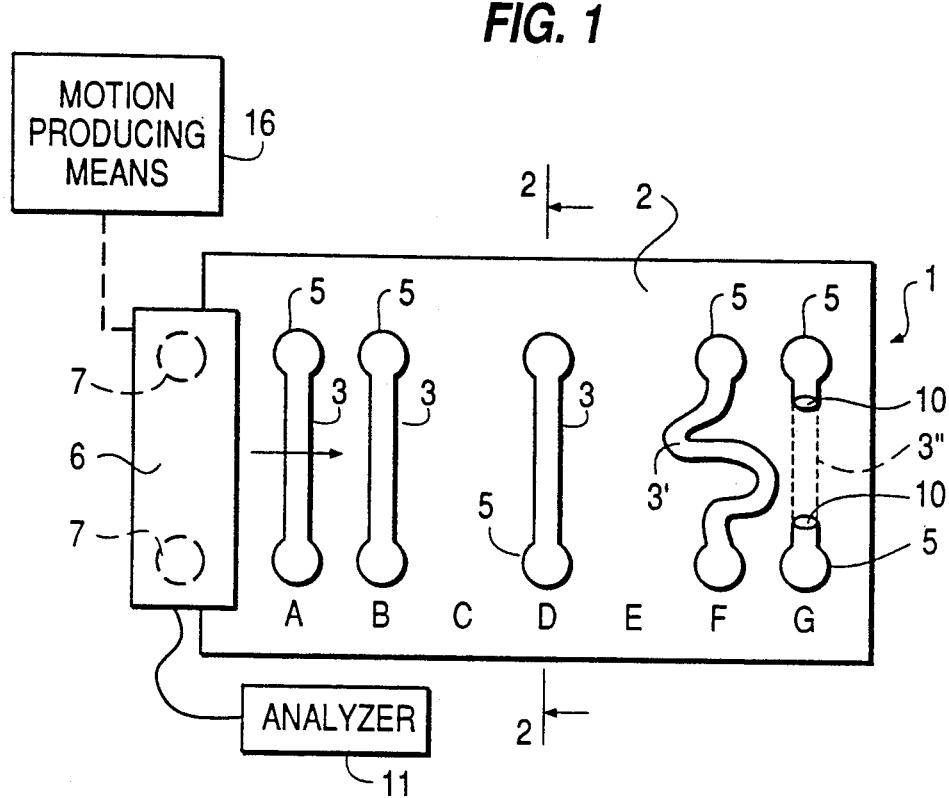
FIG. 1 is a top view of code array, i.e. a coded array with readout.

First the nature of the encoding which involves the invention will be discussed. The principle of the code array will be illustrated by a simple embodiment with reference to FIGS. 1-3.

A card indicated generally at 1, for purposes of illustration, is designed as a bank access card such as an automatic teller card or debit card and bears a code array, i.e., a coded array, serving purposes the details of which are beyond the scope of this discussion, such as clearance for authorized personnel at entrances, for making cashless payments, etc. In the simple embodiment shown, the card 1 comprises an electrically non-conductive, planar substrate 2 which can be made of a plastic. A coded array of an electrically conductive material, for instance copper, is deposited on this substrate 2. In this illustration, the coded array consists of a bar code in the form of conductive connectors 3 located at code sites A through G. As shown by FIG. 2, a covering 4 made of an electrically non-conductive material like the substrate 2, which may also be plastic, lies over the coding connectors 3. The covering 4 is preferably made of an opaque material so that, following the deposition of connectors 3, their arrangement no longer can be seen by the eye. The covering 4 illustratively may be a layer of enamel or lacquer. For the sake of clarity, covering 4 is omitted from FIG. 1.

The ends of the connectors 3 are enlarged with respect to the rest of the connectors to act as coupling sites 5. The coupling sites 5 are located precisely at the code sites A through G. A reader 6 is movable above the card 1 in the direction of the arrow of FIG. 1 either manually or by any convenient mechanical device such as motion producing means 16. Since relative movement between the reader and the card is the essential factor, it is not important whether the card or the reader is moved. Thus, the card can be passed through a housing containing the reader. In this embodiment, the reader 6 is regarded as being movable and comprises two circular electrodes 7 on its lower side which, upon motion of the reader in the direction of the arrow of FIG. 1, arrive sequentially at and above the coupling sites 5.

Figure 2:
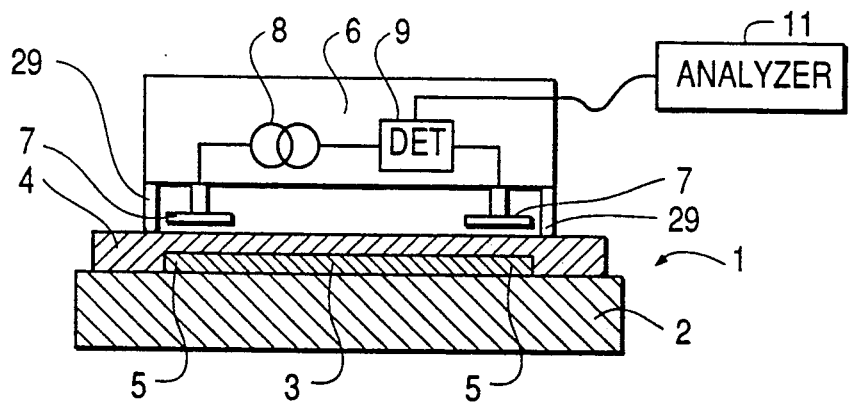
FIG. 2 is a section along line 2—2 of FIG. 1.
Figure 3:
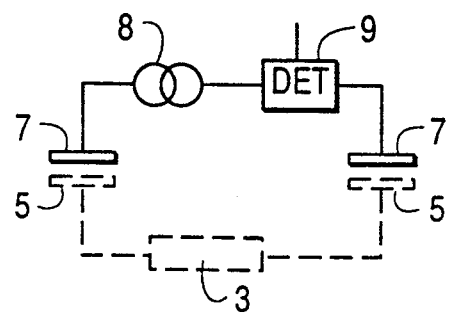
FIG. 3 is the electrical equivalent network of the coded arrays of FIGS. 1 and 2.

FIG. 3 shows an electrical equivalent circuit of the structure of FIGS. 1 and 2. Together with the coupling sites 5, the electrodes 7 form capacitors and the connectors 3 form an ohmic resistance. An AC circuit including an AC generator 8 and a detector 9 is present inside the reader 6. In the absence of some external electrical coupling to electrodes 7, this AC circuit is open between the ends of the circuit at electrodes 7.

When the reader 6 is moved in the direction of the arrow of FIG. 1, then the electrodes 7 are consecutively capacitively coupled to the coupling sites 5 of the connections 3. Whenever there is capacitive coupling there will be an AC current from the generator 8 through the capacitors 5, 7 and through the resistors formed by the connectors 3, and the detector 9 indicates a current. Each connector 3 so loaded therefore acts as a segment of the AC circuit and completes that part of the circuit which is in the reader and is denoted by 7, 8, 9, 7.

The AC signal from the generator 8 is steady-state and uninterrupted. Preferably, it is a high frequency AC, typically above 100 Khz. If now the reader 6 moves at a comparatively high speed, illustratively at 1 m/s above the coded array, and if the width (in the direction of motion) of each coupling site is 1 mm, then the capacitive coupling between the electrodes 7 and each coupling site 5 will exist for a time interval of about one millisecond. At a generator frequency of 1 Mhz there are about 1,000 AC periods during the time of coupling. Therefore the detector 9 is able to measure or sense the resulting current over a range of pure AC free of interference, that is, it will be unaffected by any transients.

If, as shown in FIG. 1, the reader 6 moves along the array shown, then it will sense a current at the codes sites A, B, D, F and G but not at C and E. The code 1-1-0-1-0-1-1 is the result.

As shown by FIG. 1, the essence of the connectors 3 is that they link a particular pair of coupling sites 5. Such linkage need not be straight. The connector 3' is sinuous at the coupling site F. It serves the same purpose as the straight connectors 3 of the previous connections. At the code site G, part of the connector 3'' is on the back side of the card, being provided with feedthroughs at sites 10 to the top side. This example is merely provided to indicate the many possible designs.

The reader 6 may be provided with an output line at its detector 9 to feed the detector signal to an analyzer 11 which may be external. A computer can advantageously be used to analyze the output signals produced by detector 9 and recognize the code.

The coded array shown in FIGS. 1 and 2 can be read by the reader 6 whether a covering 4 is present or not. Clearly, coded arrays are especially advantageous when they are provided with a covering 4 opaque to the human eye which thus cannot discern the code represented by the array. However, in special applications, coded arrays without covering may also be used.

An illustrative application of the code technique described is process control for enameling motor vehicle fenders. A coded array as shown in FIGS. 1 and 2 is mounted at a specific fender location and the paint primer layer of the fender serves as the electrically insulating substrate 2 on which the adequately electrically conductive coded array is deposited. Different fenders can be identified by the coded arrays, for instance front, rear, left, right, or fenders for different models of the vehicle. The coded array is exposed before the final enameling. After this final enameling, the coded array is invisibly masked by the enamel which forms the equivalent to covering 4 of FIG. 2. Even after the enameling, the fender still can be identified by means of the coded array using a reader 6.

Another illustrative example is an esthetic, expensive box holding an expensive perfume. A coded array is deposited on the cardboard which serves as the substrate. Then the entire box is lacquered in a high-grade manner, including the coded array. The coded array is then invisible from the outside and does not interfere with the esthetics of the box. Nevertheless, such boxes can be identified by means of their individual coded arrays, for instance when being monitored during marketing.

The coupling sites 5 of FIG. 1 are wider than the connectors 3 to achieve higher capacitance with the electrodes 7 shown here as plate electrodes. This feature is not required if the detector circuit used is sufficiently sensitive.

Figure 4:
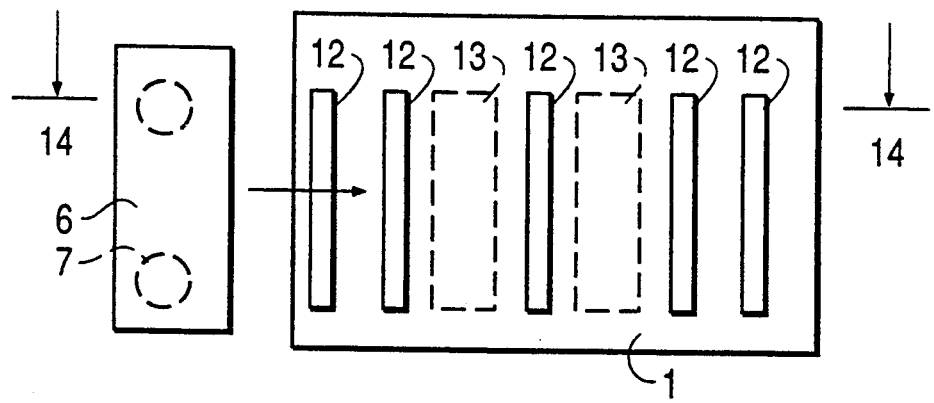
FIG. 4 is a simplified view similar to FIG. 1 of a variation in coded array.

FIG. 4 shows a plain bar code (here as elsewhere, the opaque covering 4 shown in FIG. 1 has been omitted for clarity). In the coded array of FIG. 4, the electrically conductive bars 12 are elongated rectangles. Again the reader 6 is moved in the direction of the arrow and capacitively couples with the opposite end of the bars 12 as shown in FIG. 2. The code array lacks two bars (dashed rectangles). This provides coded array information when reading this bar code.

The code array described in relation to FIG. 4 is positive, i.e., bars of electrically conductive material are present at the coded sites whereas only electrically non-conductive material is present at sites 13 where the bars are absent. However, it is also possible to encode in a negative manner. In that event the entire surface of the card is coated with an electrically conductive material which is removed from the sites equivalent to bars 12. If the reader 6 moves above such a coded array in the direction of the arrow, then it will ascertain a conductive connection between the electrodes everywhere except at the locations corresponding to bars 12 which lack conductive material.

In another embodiment, which will be described with reference to FIG. 4, detector 9 of reader 6 is designed in such a manner that it can quantitatively measure the electrical resistance R of the connector 3. For this purpose, the detector 9 can be a simple AC ohmmeter. If in FIG. 4 widened bars 13 are provided (as shown by the dashed lines) instead of coding gaps, and these bars 13 are twice the width of bars 12, and therefore their ohmic resistance over their length is about half, then the reader 6 can sense and analyze this condition and thereby recognize the code.

As already mentioned, different ohmic resistances of the connectors between the coupling sites at the ends of the bars 12 or 13 can be achieved by means of different widths of the bars 12 or 13. On the other hand the bars can be formed with different thicknesses or consist of materials of different conductivities.

Illustratively, such a coded array may be printed with conducting ink. Double-thickness bars may be produced by double printing. Such coded arrays may be made very economically in one printing procedure. Suitable conducting inks, for instance containing carbon particles, are available commercially.

Figure 5:
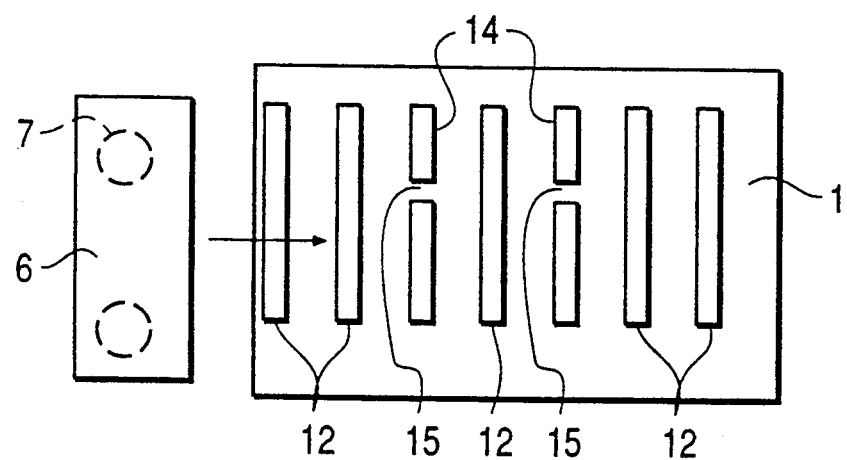
FIG. 5 is another variation of the coded array of FIG. 4.

FIG. 5 shows a variation in which all bars are equally long and equally wide. However, bars 14 are interrupted by one break 15 in each. Such coded arrays may be highly economical by preparing them in uncoded manner in the form of equal and continuous bars 12 and thereupon encoding them by introducing breaks 15 at the sites to be coded. Illustratively the breaks 15 may be made by mechanical scraping, etching or the like.

FIG. 6 is an embodiment again comprising the code of FIG. 4 with bars 12. A bar is missing at two locations, so that encoding is achieved in a simple manner. The coded array of FIG. 6 differs from that of FIG. 4 in that the bars 12 are joined at their lower ends in a comb-like manner to a bus 18. In this case the reader may be made in two parts, namely a stationary part 6a which, during readout, couples with the bus 18 and a part 6b which is moved in the direction of the arrow precisely in the same way as the reader 6 is in FIG. 4, so that its electrode moves over the upper ends of the bars 12.

Figure 6:
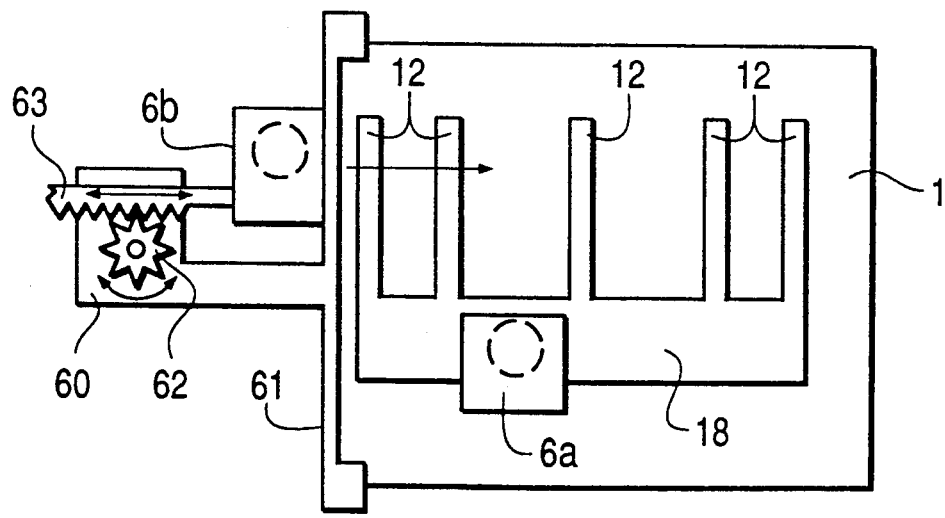
FIG. 6 is still another variation of the coded array of FIG. 4.

As regards the embodiment of FIG. 6, the reader movable part 6b is moved across the coded array. This is a relative motion between the reader part and the coded array and this relative motion can be generated either by moving the movable reader part or the coded array. Again, as to the embodiment of FIGS. 1 and 2, selectively the reader 6 may be moved if the card 1 is stationary or if the reader 6 is stationary, then the card 1 is moved.

As shown by FIG. 6, the relative motion between the card 1 and the movable reader 6b can be obtained using a motor drive. A motor 60 is affixed to the card 1 by a clamp 61 and drives a pinion 62 which engages and drives a gear rack 63 fastened to movable reader part 6b. Similar motor drives also can be provided in the array of FIG. 1 to produce relative motion between the reader 6 and the card 1.

Figure 7:
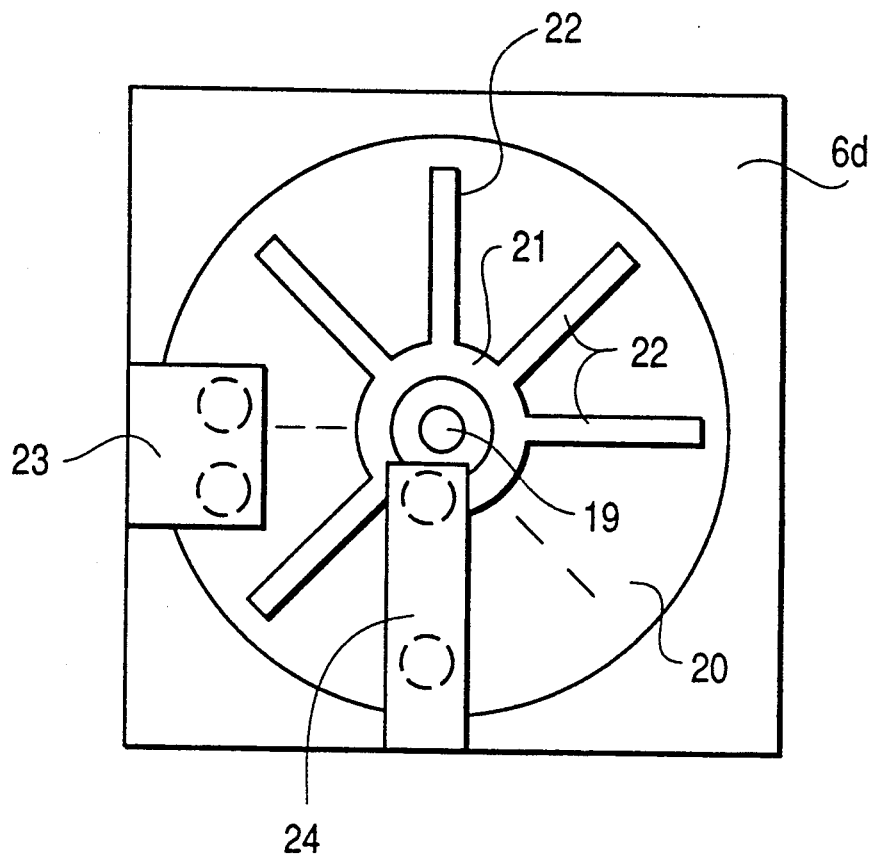
FIG. 7 is a coded array similar to that of FIG. 1 with further variations in coded array.

FIG. 7 shows a further variation illustrating several such possibilities of the invention. The reader 6d is shown in top view and is in the form of record player with a centering pin 19, receiving a circular code disk 20 with central aperture. This code disk bears a coded array consisting of a central ring 21 from which bars 22 radiate outwardly at unequal angles forming a coded array. In the embodiment shown, bars 22 provided are 45° apart or else, as indicated at two sites by dashes, are omitted to create a coded array. The code disk 20 is rotatably driven by the reader 6d.

Two embodiments of the reader 6d are shown. In one variation a reading head 23 comprises two adjacent electrodes (dashed circles) responding when coupling with neighboring bars 22, the current then passing between the coupling sites at the outer ends of the bars 22 through the annular bus 21.

In another embodiment a reading head 24 is provided which couples the bars 22 at the radially outer and radially inner ends, by means of its two electrodes. In this embodiment, the annular bus 21 connecting the inner ends of the bars can be omitted.

Again different coded arrays may be used for the embodiment of FIG. 7. Either a geometric coded array, wherein bars 22 are present or not, or bars may be present at all code sites—in this example shown 45° with selected bars being altered, e.g., interrupted, to create the coded sites. The bars furthermore may be coded by making them various ohmic resistances, being of different widths or thicknesses.

Care must be taken moreover when moving the reader 6 above the coded array that the electrodes 7 remain at a height as constant as possible above the coded array. This is especially important to keep constant the reader's distance-dependent discrimination. In that event spacers are required which ensure a constant distance between the electrodes 7 and the coded array during readout. Such spacers are shown in FIG. 2 in the form of gliding feet 29 affixed to the lower side of the reader 6, so that the reader glides directly along the surface of the card 1. As will be appreciated, the relative movement between the reader and the coded substrate can be accomplished manually, this being particularly appropriate when the coded substrate is part of a card as described above. This applies to any of the embodiments described herein as does the possibility of a simple motor drive.

Figure 8:
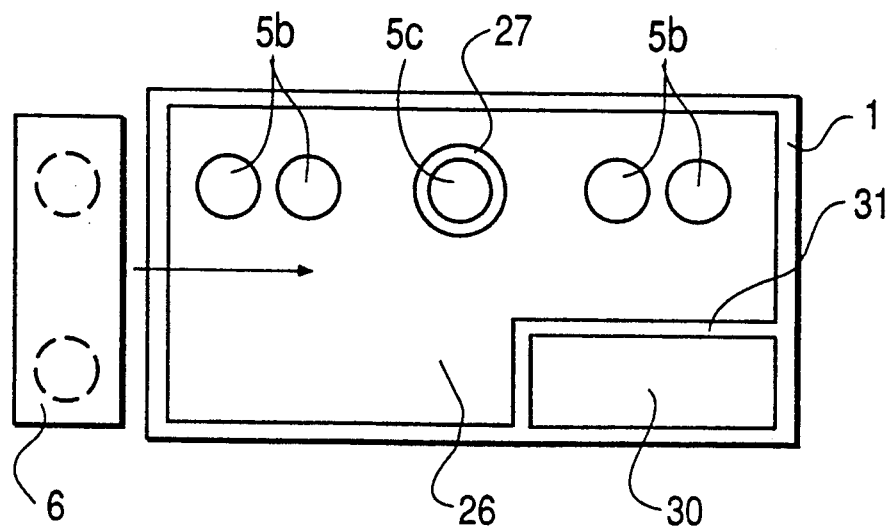
FIG. 8 is a coded array similar to FIG. 1 but with variations.

FIG. 8 shows a coded array variation not in the form of a bar code but as a continuous, rectangular, electrically conducting surface array 26 read by a reader 9 which is moved in the manner of the embodiment of FIG. 1 in the direction of the arrow. The bottom electrode of reader 6 shown in FIG. 8 everywhere couples to the same capacitance as it moves along its entire readout path above the first part of the substrate which has conductive area 26. The top electrode of reader 6 in FIG. 8 sequentially moves above differently coded coupling sites 5b and 5c. The coupling sites 5b are identical. Illustratively they may be perforations made by stamping or by masking when the surface array 26 was deposited, and the electrode at the top of the reader 6 in FIG. 8 will couple capacitively with such perforations not at all or only weakly. The electrode of the reader 6 at the top in FIG. 9 always sees the same unchanged capacitance which corresponds to that seen also by the reader electrode at the bottom in FIG. 8.

The coupling site 5c of the embodiment of FIG. 8 assumes a somewhat different design. In this case a ring 27 has been removed from around the actual, circular coupling site 5c whereby this coupling site no longer is electrically connected to the surface array 26. At this site again the reader 6 detects no current, or only a much weaker one.

A segment 30 of the surface array 26 shown in FIG. 8 at the bottom right is separated by a non-conductive band 31 from area 26. The point here is to show that even large-area segments can be separated. If reader 6 on its path from left to right in FIG. 8 comes to a point where its lower electrode is over the separated segment 30, it no longer can detect a current and therefore no more coding can be ascertained in this part of the card 1. This feature may be used as added coding.

As already discussed, the simplest coded arrays are bar codes. The higher the information density of the bar code, the closer these bars must be to each other. This entails increased requirement for geometric resolution of the reader which now must distinguish two tightly adjacent bars from a single one. For that purpose electrode arrays such as are described in relation to FIGS. 9 through 12 are advantageously used.

Figure 9:
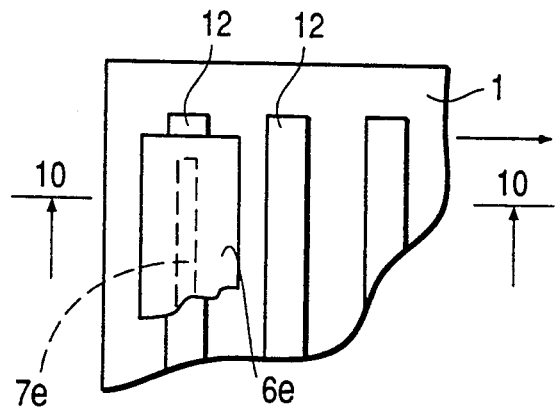
FIG. 9 is a cutaway of FIG. 1 showing a code array with a narrow bar electrode.
Figure 10:
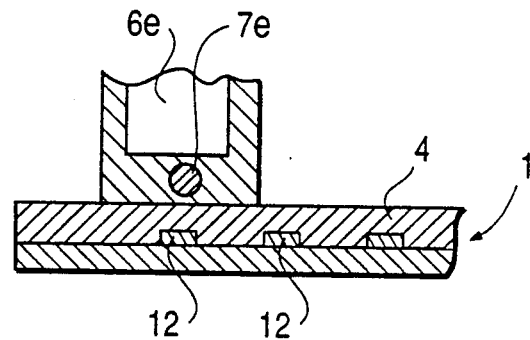
FIG. 10 is a section along line 10—10 of FIG. 9.

FIGS. 9 and 10 are top plan and sectional side views (corresponding to FIGS. 1 and 2) of a reader 6e for reading a coded substrate wherein the coding is formed by bars 12. Only one electrode 7e is shown which is meant to couple with the coupling sites at the upper ends of the conducting bars 12. Again, the reader 6e is moved so as to read in the direction of the arrow.

As shown by FIGS. 9 and 10, the elctrode 7e is made rod-like, narrow and parallel to the bars 12 in order to increase the spatial resolution of the electrode 7e. As shown by the Figures, electrode 7e also can couple on a large area, that is with large capacitance, with the bars 12, while nevertheless coupling only with the particular bar underneath, not with the adjacent one.

If the resolution must be increased further, that is if the bars are still closer together, the above design might not be enough. In that case the design shown by FIGS. 11 and 12 will help.

Figure 11:
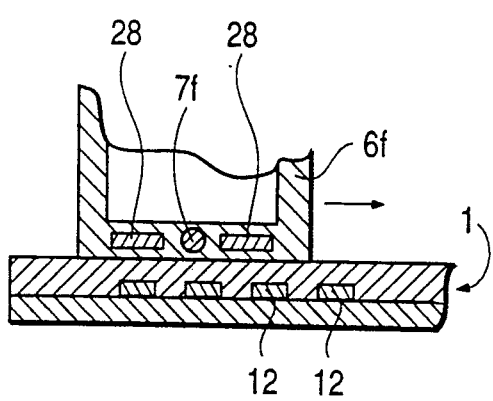
FIG. 11 is similar to FIG. 10 but with a variation of shielding electrodes.
Figure 12:
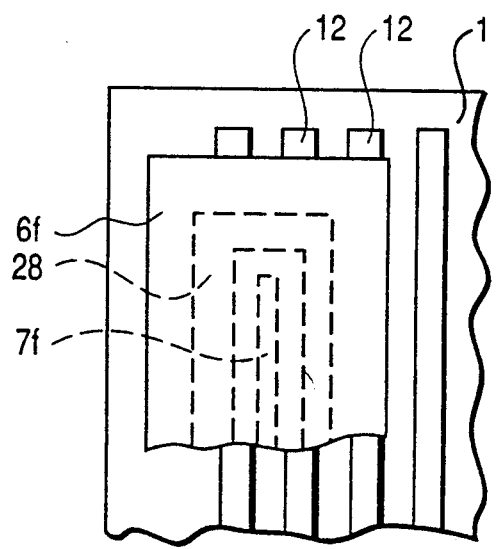
FIG. 12 shows the design of FIG. 11 in elevation as in FIG. 9.

FIG. 11 shows a reader 6f in a view similar to FIG. 10. It will be noted that with respect to the readout movement direction indicated by the arrow, shielding electrodes 28 are present in front and behind the rod-like electrode 7f. These shielding electrodes are grounded. As shown in top view in FIG. 12, shielding electrodes 28 in front and behind the electrode 7f as seen in the readout direction may be hoined together at the ends so that they form a shielding window enclosing the electrode 7f or also both electrodes of the reader 6f.

The shielding electrodes 28 capacitively ground the bars 12 below them. Only one bar 12 located between the shielding electrodes is not capacitively grounded in this manner and, by means of capacitive coupling to electrode 7f, may accept a current from it.

Illustratively such a spatially highly resolving electrode array also may be used in ascertaining the code by means of the width of the bars without having to compute its resistance. For instance as regards the coded array of FIG. 4 with bars 12 and 13 of different widths, a constant speed of advance of the reader 6 allows determining how long the electrodes are moving over each particular bar in order to use their widths as coding information.

In the above illustrative embodiments, the coding array always has been coupled capacitively from the top by means of electrodes. As shown by FIG. 2, the substrate 2 may be made relatively thick and dimensionally stable. The coded array also may be affixed to the surface of a bulky object.

Figure 13:
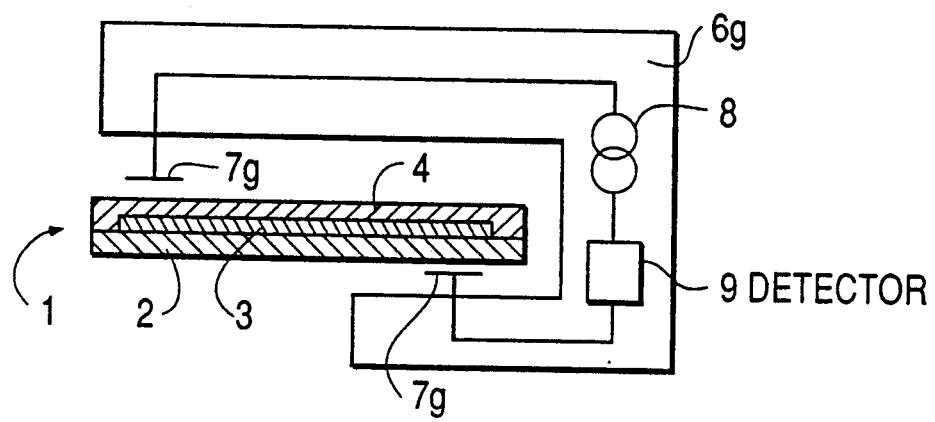
FIG. 13 is a view similar to FIG. 2 of a variation of the reader.

If necessary or desirable, however, readout may be implemented from both sides, that is, from the top side and from the bottom side of the card, i.e., by electrodes passing along the two major faces of the card or other substrate, as shown by FIG. 13. In that case the substrate 2 is preferably thinner. Otherwise the card 1 corresponds to the embodiment of FIG. 2. A reader 6g has electrodes 7g which, corresponding to the embodiment of FIG. 1, couple with the two ends of code bars 3. One electrode, however, is coupling from the top side and the other from the bottom side. Again as regards the other embodiments of the reader, for instance for readers 6a, 6b of FIG. 6, readout may be carried out selectively from the top or from the bottom.

Figure 14:
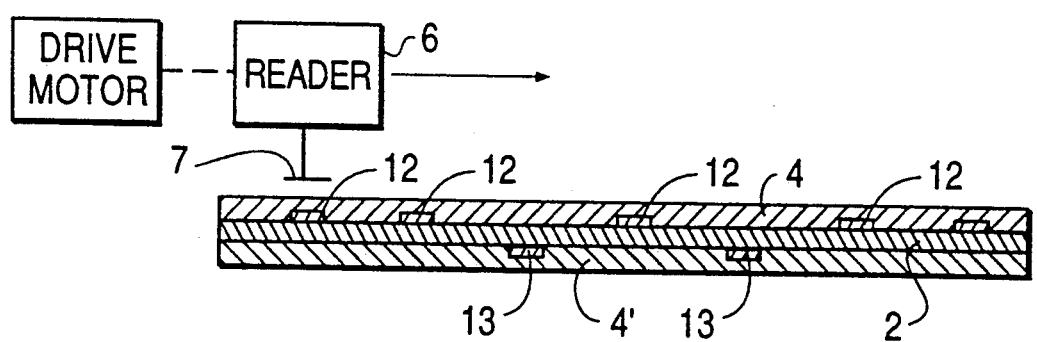
FIG. 14 is a view along line 14—14 of FIG. 4 of a variation of the coded array.

FIG. 14 shows another variation of the invention as a section along line 14—14 of FIG. 4. In this case the bars 12 and 13 of the coded array are at different depths, they are mounted on different sides (top and bottom) of a thin substrate 2 covered on opposite sides by coverings 4 and 4'. The reader 6 may be designed as discussed in relation to FIGS. 1 and 2 and performs its readout by means of electrodes 7 as it is moved relatively in the direction of the arrow.

Figure 15:
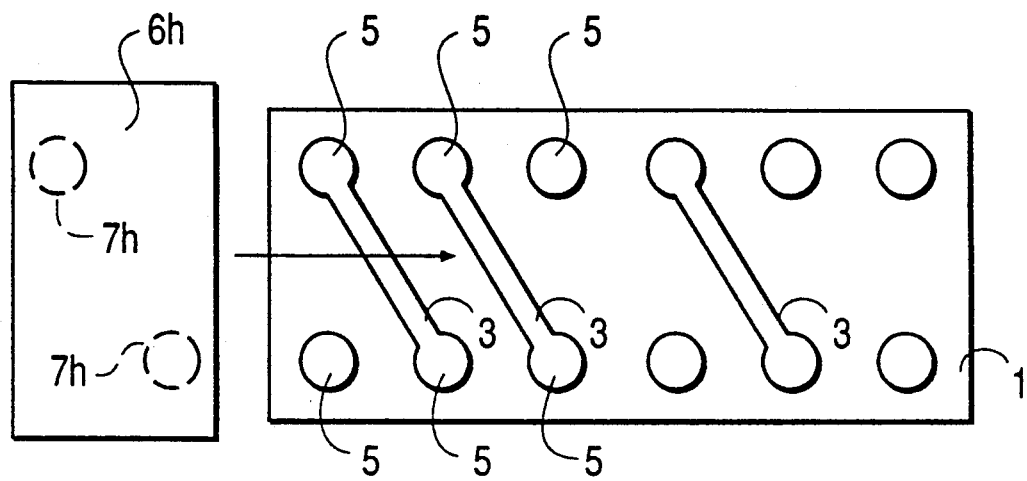
FIG. 15 is a view similar to FIG. 1 of a variation of the coding with associated reader.

FIG. 15 shows a variation wherein the coded array comprises two rows of coupling sites 5 of which only a few (depending on the code) are pairwise linked by diagonal connections 3. As shown in FIG. 15, the connections 3 are oblique to the readout direction shown by the arrow. The electrodes 7h of a reader 6h are correspondingly laterally offset. If the attempt is made to read the shown coded array with the reader 6 of FIG. 1, failure would result. In this or similar manner, reaout may be made more difficult in order to improve reliability against forgery.

Figure 16:
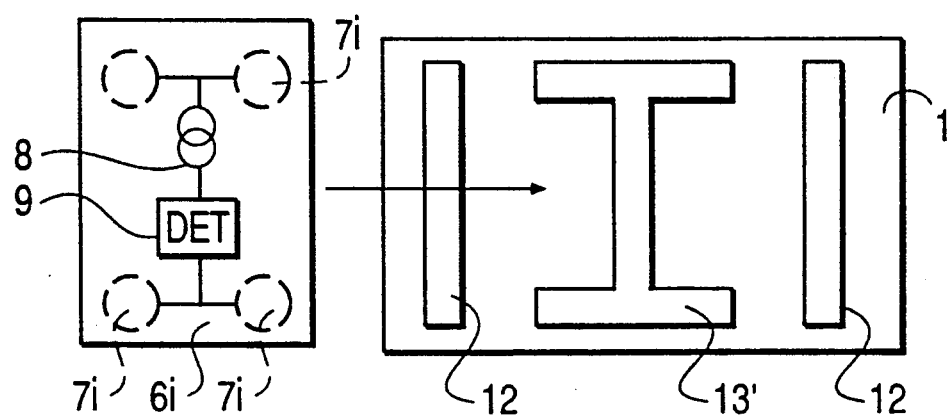
FIG. 16 is a view similar to FIG. 15 of another variation of the coding.

FIG. 16 shows another variation of the coding, with simple bars 12 and a coded bar 13' in the form of an I-bar. A reader 6i comprises two electrodes 7i mounted sequentially in the direction of readout motion in order to read the bars 12 and 13'. The reader 6i moves in the direction of the arrow above the shown coded array. When it arrives at and above the first bar 12, then that bar is detected at each end only by one electrode 7i. When on the other hand the reader 6i passes above the coded bar 13', then both electrodes will be coupling at each end of the bar 13', whereby the coupling capacitance is doubled. This is sensed as a code by the detector 9.

What is claimed is:

1. A code reader for reading a code represented by a code array on a surface, the code array including elongated electrically conductive parallel bars surrounded by an electrically insulating material, opposite ends of each bar forming first and second coupling sites, each bar being selectively continuous or not between the coupling sites to thereby define a code, the reader comprising the combination of a support body;

means for producing relative motion between said support body and said code array at a speed greater than zero and less than a predetermined maximum speed so that said body moves along a path generally perpendicular to said bars of said array;

first and second electrodes carried by said support body, said first and second electrodes comprising elongated members longitudinally spaced from each other so as to be sequentially capacitively coupled in contactless manner to opposite ends of said bars during said relative motion and to be generally parallel to said bars during said motion, said electrodes being coupled to opposite ends of the same bar at the same time, first and second grounded shielding electrodes laterally adjacent to, on opposite sides of in the direction of the path of relative motion and in the planes of said member forming said first electrode and parallel to a plane containing said code array for restricting capacitive effects of said first and second electrodes to one bar of said code array at a time;

an open series electrical circuit connected between said first and second electrodes and including a signal generator for applying substantially steady-state and uninterrupted AC to said electrodes and a detector for detecting flow of current through said series circuit, the AC frequency of said generator being selected in relation to the maximum speed of support body motion such that a plurality of complete cycles of AC take place while said first and second electrodes are capacitively coupled to a pair of connected coupling sites and while the coupling sites and the connection thereof complete the open circuit and allow current detection by said detector, whereby each detection is made substantially without transient effects.

2. A reader according to claim 1 wherein said first and second electrodes are formed with an elongated narrow shape extending generally parallel to the direction between each pair of coupling sites of the coded array.

3. A reader according to claim 2 wherein said body comprises spacers to maintain a substantially constant distance between said first and second electrodes and the surface of said coded array.

4. A reader according to claim 3 and further comprising a motor driving said body relative to said surface supporting said coded array.

5. A code array and code reader for reading a code represented by the code array on a surface comprising the combination of a code array including a plurality of elongated parallel bars of electrically conductive material surrounded by an electrically insulating material, opposite ends of each bar forming first and second coupling sites, respectively, each bar being selectively continuous or not between the coupling sites to thereby define a code, and a reader comprising the combination of a support body;

means for producing relative motion between said support body and said code array so that said body moves along a path generally perpendicular to said bars of said array at a speed greater than zero and less than a predetermined maximum speed;

first and second electrodes carried by said support body, said first and second electrodes comprising elongated members longitudinally spaced from each other so as to be sequentially capacitively coupled in contactless manner to opposite ends of said bars during said relative motion and to be generally parallel to said bar during said motion, said electrodes being coupled to opposite ends of the same bar at the same time, first and second grounded shielding electrodes laterally adjacent to, on opposite sides of in the direction of the path of relative motion and in the planes of said member forming said first electrode and parallel to a plane containing said code array for restricting capacitive effects of said first and second electrodes to one bar of said code array at a time;

an open series electrical circuit connected between said first and second electrodes and including a signal generator for applying substantially steady-state and uninterrupted AC to said electrodes and a detector for detecting flow of current through said series circuit, the AC frequency of said generator being selected in relation to the maximum speed of support body motion such that a plurality of complete cycles of AC take place while said first and second electrodes are capacitively coupled to a pair of connected coupling sites and while the coupling sites and the connection thereof complete the open circuit and allow current detection by said detector, whereby each detection is made substantially without transient effects.

* * * * *